March 19, 1946.     R. L. WELLS     2,396,729
APPARATUS FOR TESTING FUSION SEALED AMPOULES
Original Filed Sept. 9, 1943     3 Sheets-Sheet 1
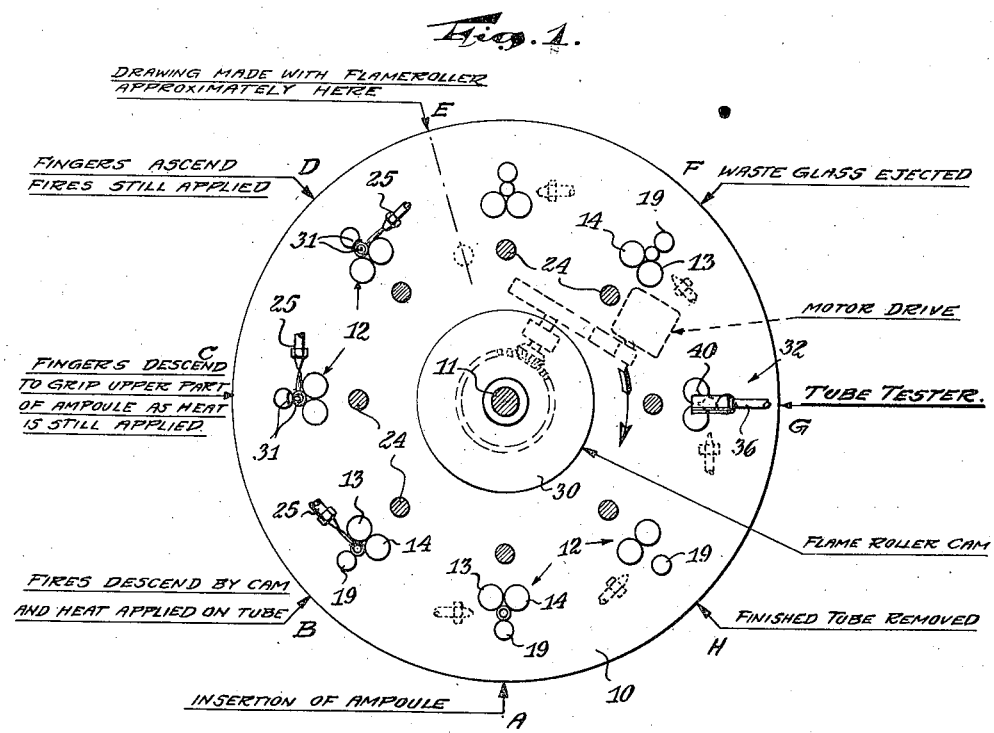
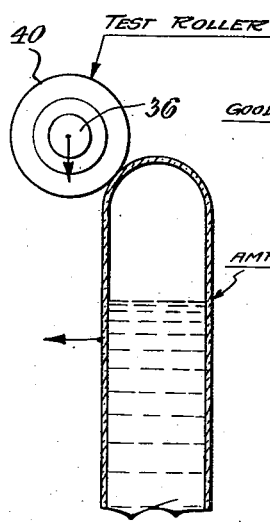
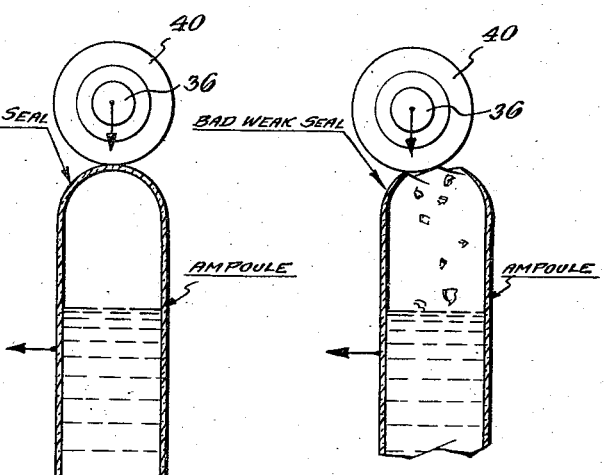
INVENTORS
RALPH L. WELLS
BY
Angelo M. Pizarro
ATTORNEY March 19, 1946.  R. L. WELLS  2,396,729
APPARATUS FOR TESTING FUSION SEALED AMPOULES
Original Filed Sept. 9, 1943  3 Sheets-Sheet 2
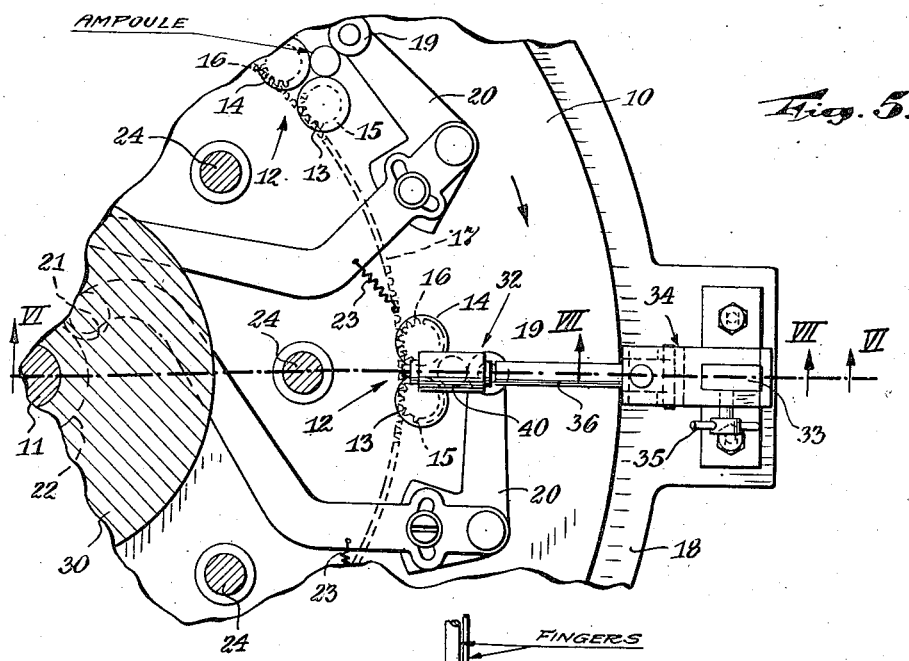
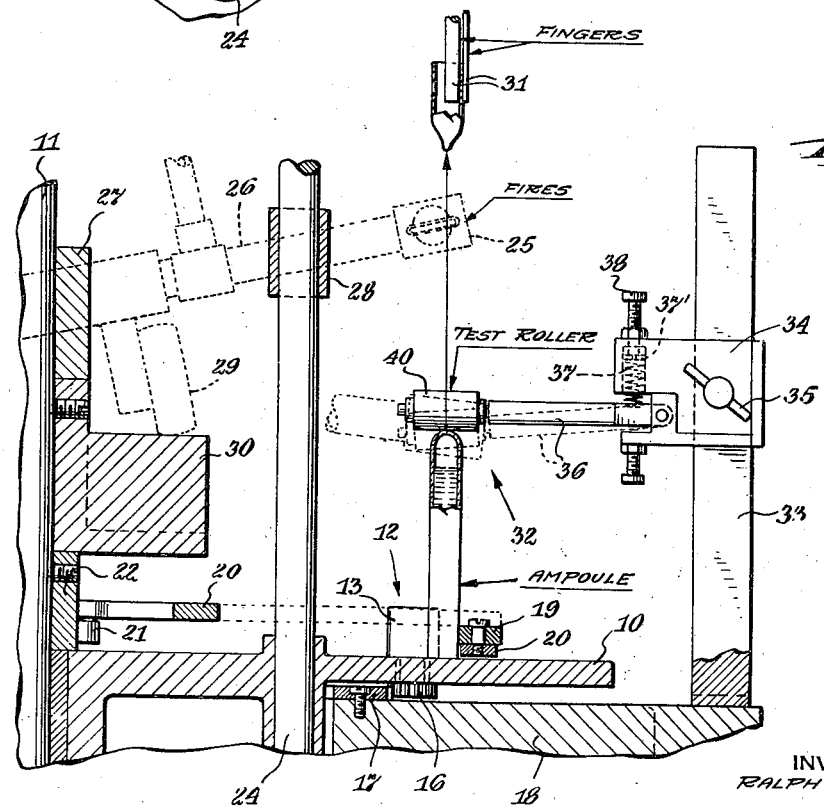
INVENTORS
RALPH L. WELLS
BY
Angelo M. Pisarra
ATTORNEY March 19, 1946.    R. L. WELLS    2,396,729
APPARATUS FOR TESTING FUSION SEALED AMPOULES
Original Filed Sept. 9, 1943    3 Sheets-Sheet 3
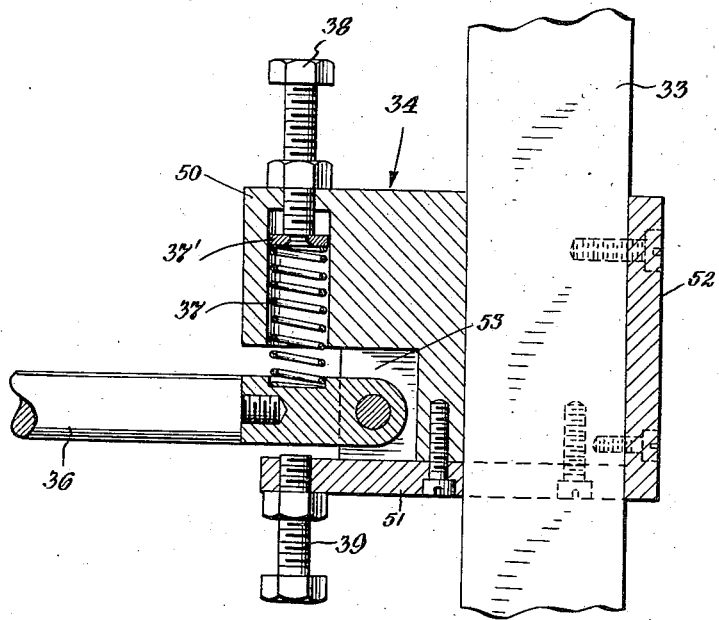
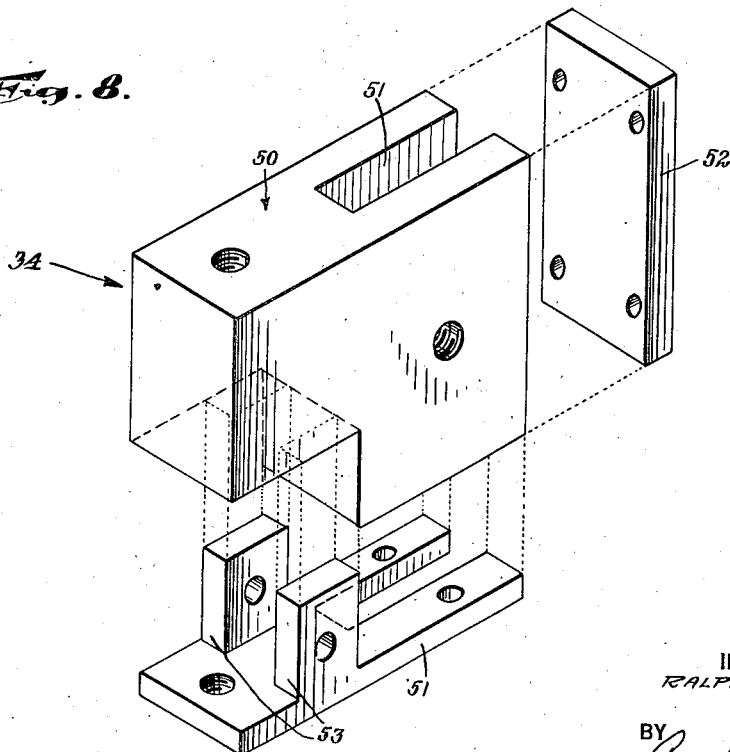
INVENTORS
RALPH L. WELLS
BY
Angelo M. Pisarra
ATTORNEY Patented Mar. 19, 1946

2,396,729

UNITED STATES PATENT OFFICE 2,396,729

APPARATUS FOR TESTING FUSION SEALED AMPOULES

Ralph L. Wells, Stelton, N. J., assignor to Johnson & Johnson, a corporation of New Jersey Original application September 9, 1943, Serial No. 501,631. Divided and this application April 11, 1945, Serial No. 587,769

3 Claims. (Cl. 73—12)

This invention relates to novel machines for sealing and testing vitreous ampoules and more particularly to novel machines for sealing and testing vitreous ampoules composed of glass or the like and containing a liquid therein.

Heretofore, ampoules composed of glass or the like, and having a liquid therein, have been hermetically sealed to prevent the exposure of any substance in the ampoule to the outside ambient. In the field of surgical sutures, the sealed ampoule contains therein, a suture immersed in a liquid which preserves the suture and maintains it in the proper flexible condition. In this particular field, the ampoules are sealed so that said liquid may be maintained within the ampoule in the course of transportation, to prevent evaporation thereof and to maintain sterile the contents thereof.

For some time it has been the practice to flame-seal the ends of glass tubes containing a liquid in which are immersed surgical sutures. For this purpose, machines have been employed. The United States Patent 2,258,408, of October 7, 1941, and issued to Frank Cozzoli, discloses a machine for that purpose. In the operation of that machine, the open ends of the ampoules, containing a liquid having surgical sutures immersed therein, are flame-sealed. Due to variations in the thickness of the walls of the ampoules, variations in the diameter of the ampoules, the variations in flame temperature in the course of an eight hours run, adjustments in the sealing flames must sometimes be made in order that the seals may meet a certain specification so that the sealed ampoules may be transported without breakage at the seal in the course of transportation. Adjustment of the flames would be required when the thickness of the seals of said ampoules was below that required to provide a sturdy ampoule. In the use of said machines, the operator would not be aware of the seals which would not pass inspection until after a large batch of "thin" sealed ampoules came off of the machine and was apprized of this by the inspector. Because of this, a large number of "thin" sealed ampoules would be made and would have to be discarded. In addition, it would then become necessary for the operator to check each jet individually in an effort to determine which of the flames might require individual attention.

It was in order to overcome the foregoing disadvantages and also to provide certain other advantages that the following invention was made. Briefly, the sealing and testing machine of this invention comprises a rotatable support for a plurality of ampoules to be sealed. Also carried on said support are a plurality of flame jets which rotate with said support and seal the open ends of the ampoules. A stationary automatically operable seal testing mechanism is located adjacent to and beyond the sealing station, to exert pressure automatically on the sealed end of each ampoule after sealing so that if the seal is too "thin," the same will fracture, putting the operator immediately on notice that the particular flame for sealing this ampoule should be checked. When the seals withstand said pressure, they are not affected by said testing mechanism. The seal-fractured tubes are discarded, the other are packed since they have met the test and the operator immediately takes the necessary step to prevent recurrence of the "thin" sealing at that flame-jet.

Another object of this invention is to provide a novel apparatus for testing a vitreous ampoule.

Still another object of this invention is to provide an apparatus for sealing and automatically testing a sealed ampoule.

These as well as other objects of this invention will in part be obvious and will in part appear hereinafter.

The invention accordingly comprises the apparatus embodying features of construction, combination of elements and arrangement of parts all as exemplified in the following detailed disclosure, and the scope of the invention will be indicated in the claims.

Referring to the drawings:

Figure 1 is a diagrammatic view showing the various successive steps of a sealing and testing machine embodying the invention.

Figure 2 is a fragmentary view showing the position of the test device as the upper sealed end of the ampoule reaches the same for test.

Figure 3 is a view similar to Figure 2 and shows the position of the test device at its highest position in the course of testing the sealed end of the ampoule.

Figure 4 is a view similar to Figure 3 and shows the fracturing of the sealed end of the ampoule when it is of insufficient strength.

Figure 5 is a top plan view of a portion of Figure 1 and shows the testing mechanism and its relation with respect to the ampoule being tested.

Figure 6 is a cross sectional view taken on line VI—VI of Figure 1.

Figure 7 is an enlarged sectional view taken on line VII—VII of Figure 5.

Figure 8 is an enlarged detail view of some of the parts shown in Figures 5, 6, and 7.

As shown in the drawings there is a turntable 10 rotatably mounted on a stationary vertical shaft 11. The turntable 10, which is disposed horizontally, may be driven at constant speed by the motor drive as shown in Figure 1. Disposed on a common virtual circumferential band whose center is vertical axis of a shaft 11 are a plurality of similar holding devices 12. Said holding devices 12, there being eight shown, are spaced about 45 degrees apart. Each holding device 12 includes a pair of vertically disposed rollers 13 and 14 mounted at a fixed location on the turntable 10. Said rollers 13 and 14 have shafts extending through openings in turntable 10. Secured to the ends of the shafts secured to rollers 13 and 14 are gears 15 and 16 respectively. A stationary frame or support 18 to which is secured the shaft 11, has a stationary gear segment 17 secured thereto. The stationary gear 17 meshes with the gears 15 and 16 to drive the rollers 13 and 14 during rotation of the turntable 10. Each holding device 12 includes also a third roller 19 located adjacent and in front of the other two rollers 13 and 14. The roller 19 is rotatably mounted on the outside end of a pivoted arm 20 having a cam follower 21 at its other end. The arm 20 has a spring 23 which tends to maintain the roller 19 against an ampoule located between said roller and rollers 13 and 14. The cam follower 21 engages a stationary cam 22 and is maintained in contact therewith by spring 23. Located inwardly from each holding device 12 and on the radius from the center of shaft 11 and passing through the center of holding device 12 is an opening through turntable 10 through which extends a guide post 24 secured to said turntable 10. Each post 24 guides a gas flame jet 25 carried at the outer end of an arm 26 whose inner end is pivoted to a collar 27. The collar 27 is freely mounted for rotation about the fixed shaft 11. This collar 27 moves in unison with the turntable 10 by virtue of a connection of the arm 26 with a slide collar 28 on guide 24. The inner end of each arm 26 has a cam follower 29 riding on a stationary cam 30 fixedly mounted on stationary shaft 11. On the upper end of each post 24 is supported a grip finger mechanism, with only grip fingers 31 shown for automatically removing the excess glass in the course of sealing.

The foregoing has been illustrated more or less diagrammatically in the drawings and has been briefly described because it is not in itself the invention. A detailed description and illustration of a sealing machine of this type is disclosed in said Cozzoli patent.

According to this invention, a seal testing device 32 is mounted in a fixed position. The testing device 32, as shown for the purposes of illustration, consists of an upstanding standard 33 fixedly secured to the stationary frame 18. Mounted on said standard is a three element metallic block 34 shown in detail in Figure 8 and in assembly in Figure 7. The block 34 is mounted on standard 33 and its vertical position thereon may be varied by loosening the set screw 35. Upon tightening said set screw in the opening in the side of the block 34, it may be maintained in any desired position. The block 34 extends inwardly towards the shaft 11 and terminates a material distance outside of the path of travel of the ampoules. The block 34 has a recess into which extends an elongated arm 36 whose outer end is pivoted to said block and whose inner end is free. A coiled spring 37 is located in another recess in said block and has its lower end bearing against said arm 36 and its upper end bears against a washer 37 at the lower end of a bolt or screw 38 making threaded connection with said block. The degree of force applied to said arm 36 may be varied by raising and lowering the bolt 37. A bolt or screw 39 makes threaded connection with the block and extends upwardly to the lower face of the arm 36 and limits the extreme lower position of the arm 36. The arm 36 extends inwardly towards the shaft 11 and terminates outwardly from the path of the posts 24 during rotation of the turntable, but extends inwardly as to be located above the path of the ampoules held by the holding devices 12 and preferably somewhat inside of the path of said devices 12. The inner ends of the arms 36 may have a free rotatable roller 40 composed of any desirable material, such as rubber or the like thereon.

The operation of this machine is as follows: After the motor has been started, the turntable 10 is rotating, the gas flame from jets 25 have been properly adjusted, the height of arm 36, the force of spring 37 and the screw 39 set, the operator takes an ampoule, which may be composed of glass and having one end open, containing a surgical suture immersed in a liquid. This ampoule is placed in a holding device 12 as that holding device passes between station H and A as the turntable rotates in the direction of the arrow. Upon continued rotation of the turntable 10, the flame jet 25 adjacent, this particular holding device 12 is automatically lowered and while the ampoule is rotating between rollers 13 and 14 while at the same time moving with turntable 10, the flame from jet 25 is applied against the upper side wall of this ampoule. As this occurs, the next succeeding holding device 12 moves between said stations H and A and the operator places an ampoule in this holding device and in like manner, the flame from jet 25 adjacent thereto is automatically lowered and the ampoule is subjected to the same action as the previous ampoule. This particular step of ampoule insertion is repeated by the operator as the holding devices 12 arrive successively between these stations in single file and spaced relation. These ampoules all move in a common circular path, with the ampoules being in spaced relation and single file. As each ampoule passes the station A, the flame is applied to the upper end of the ampoule which is rotated by rollers 13 and 14. These ampoules pass station C where the flame is still applied by jet 25 and the grip fingers 31 are automatically actuated to lower and grip the upper end of the excess glass of the ampoule whose upper part has become sufficiently heated so that it becomes sealed. The grip fingers 31 grip the excess glass and are automatically raised to remove the same therefrom between stations D and E and between which stations the sealing takes place. As the turntable advances from station D, the cam 30 acting against follower 29 starts raising the jet 25 upwardly beyond the upper limit of the ampoule. As the ampoule passes the station F, the excess glass is ejected from grip fingers 31. The seal of the ampoule which has not been in contact with the flame from jet 25 from the station E is sufficiently cooled as it reaches station G where the seal testing device is at a fixed location during rotation of the turntable 10. As the sealed ampoule reaches station G, the sealed end of the ampoule is automatically tested thereby. In the course of rotation of the turntable 10, there is a force applied downwardly on the seal in the direction of the vertical axis of the ampoule while the ampoule is still supported by the turntable and moving therewith. This action is shown in Figures 1, 2, 3 and 14. As the ampoule reaches station G, the outer end spring pressed arm 36 is pushed upwardly along the upper end of the seal and if the seal is of at least the desired strength, the force of the roller on the seal will not cause any fracture thereof as shown in Figure 3, but if too "thin" and below the desired length, it will fracture as shown in Figure 4. In either case the tested ampoules are carried by the rotating turntable 10 to the station H where the ampoules are removed from the machine. By employing this particular combination, there is provided a continuous process for sealing and testing ampoules. The operator merely feeds the ampoules into the holding devices between stations H and A and removes the sealed and tested tubes between stations G and H. In this manner as shown, the ampoules are supplied to a continuously rotating turntable with the ampoules being continuously maintained in a single file, spaced relationship. The ampoules travel in a fixed curvilinear path in which they are automatically sealed and thereafter are automatically subjected to a downward pressure at the seal while the ampoules are in that path, after they leave the sealing zone and while the rotation of the turntable is continued and they are supported thereon. By employing the novel combination disclosed, only those ampoules which are not effected by the testing device are packed, while those which are fractured due to "thin" seals are discarded and when the "thin" seals occur the operator is immediately put on notice that some correction must be made.

Since certain changes in the constructions set forth, which embody the invention, may be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention, which as a matter of language might be said to fall therebetween.

This is a division of my co-pending application, Ser. No. 501,631, filed on September 9, 1943.

I claim:

1. A device for testing the seals of glass tubes sealed by fusion comprising a movable carrier, a series of tube holding means carried thereby, an element positioned above said tube holding means and in position to act against a sealed glass tube in the region of its seal when the tube carried by said tube holding means is located in a position thereunder, means for actuating said carrier to move said tube holding means in a predetermined path thereby to move said tube holding means successively from a position ahead of said element to testing position under the latter and then past said element, said element being movable in a plane which includes the longitudinal axis of said tube arriving at testing position, said element operating upon successive tubes to exert a compression force upon the sealed end of the respective tubes sufficient to fracture the tubes if their seals are relatively weak.

2. A device for testing the strength of the seals of glass tubes sealed by fusion comprising a movable carrier, a series of tube holding means carried thereby, means positioned above said tube holding means and in position to act against a sealed glass tube in the region of its seal when the tube carried by a tube holding means is positioned thereunder, driving means for rotating said carrier to move said tube holding means in a predetermined curvilinear path thereby to move said tube holding means from a position ahead of said second mentioned means to testing position thereunder and then therepast, said second mentioned means being at a fixed location in the course of rotation of said carrier and movement of said tube holding means and tubes and being automatically operable to act on each tube arriving at testing position; said second mentioned means operating upon successive tubes to exert a compression force upon the sealed end of the respective tubes to fracture the tubes if their seals are weak.

3. A device for testing the strength of the seals of glass tubes sealed by fusion combining bodily shiftable tube holding means, an element movable in a plane which includes the longitudinal axis of a tube when the tube is in testing position and positioned above said tube holding means in position to react upon the sealed end of a tube on bodily movement of the latter to a position thereunder, means for effecting such relative shifting movement between tubes in said holding means and said element thereby successively to effect transportation of tubes from an ineffective position to an effective position with respect to said element and means consequent upon said shifting movement to effect said reaction thereby to fracture the tube if the seal is relatively weak, and means for varying the effective force of said movable element to suit tubes of a different strength factor.

RALPH L. WELLS.